United States Patent [19]

Foutch

[11] Patent Number: 4,830,067

[45] Date of Patent: May 16, 1989

[54] SPLASH GUARD

[76] Inventor: Wendal L. Foutch, 340 Marion Ct., Saline, Mich. 48176

[21] Appl. No.: 146,957

[22] Filed: Jan. 22, 1988

[51] Int. Cl.$^4$ .............................................. B65B 1/04
[52] U.S. Cl. .................................. 141/86; 141/311 A; 141/390; 141/97; 141/370; 220/85 R
[58] Field of Search ............... 141/286, 390, 391, 392, 141/97, 370, 371, 372, 85, 86, 87, 88, 311 A; 220/85 R, 85 SP, 85 E, 86 R, 85 F

[56] References Cited

U.S. PATENT DOCUMENTS

| | | | |
|---|---|---|---|
| 1,903,139 | 3/1933 | Trompeter | 141/285 |
| 2,467,001 | 4/1949 | Allen | 141/86 X |
| 2,538,813 | 1/1951 | Wagner | 141/390 |
| 2,555,868 | 6/1951 | Bowman | 141/86 |
| 2,659,523 | 11/1953 | Comber | 141/390 |
| 3,451,445 | 12/1967 | Sippola | 141/285 |
| 3,739,988 | 6/1973 | Kisor et al. | 239/288 |
| 3,903,942 | 9/1975 | Vest | 141/301 |
| 3,992,051 | 11/1976 | Hitch | 141/390 X |
| 4,326,641 | 4/1982 | Wilken | 220/86 AT |
| 4,744,482 | 5/1988 | Ohsawa | 220/85.5 P |

Primary Examiner—Ernest G. Cusick
Attorney, Agent, or Firm—James M. Deimen

[57] ABSTRACT

A splash guard for an automotive fill pipe comprising a flexible plastic baffle positioned over the fill pipe cap and having a central hole sized to sealingly engage a gas pump nozzle. The baffle is hingedly attached to the vehicle adjacent one side of the fill pipe and releasably attached adjacent the other side of the fill pipe. In one embodiment, the baffle hinged attachment is to the inside of the access door to the fill pipe. In another embodiment, the attachment is to a bracket in turn attached to the fill pipe. In either embodiment the baffle is manually movable to permit removal and replacement of the fill pipe cap.

20 Claims, 3 Drawing Sheets

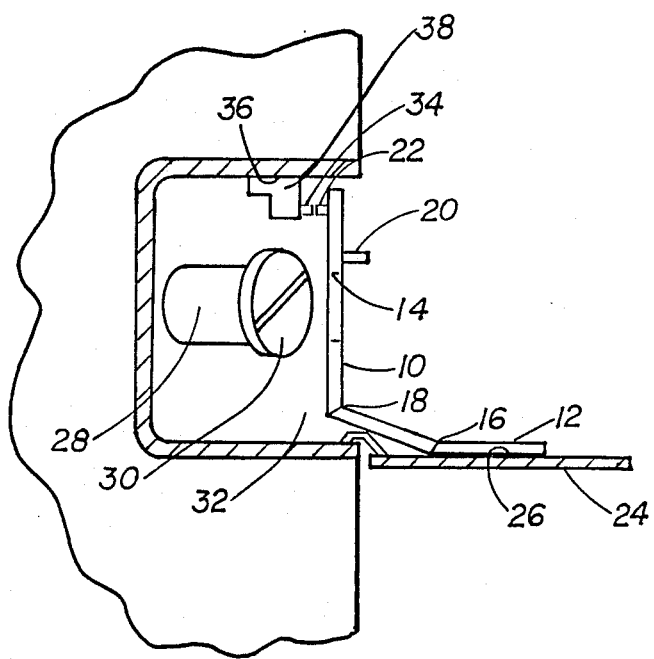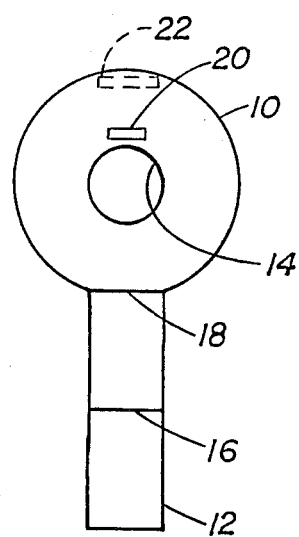

SPLASH GUARD

BACKGROUND OF THE INVENTION

The field of the invention pertains to automotive fuel tanks, and in particular, to the fill pipes of such tanks. Typically, the fill pipe extends upwardly into a chamber or cavity covered by a spring urged access door. The upper end of the fill pipe is closed by a cap. The door is opened, the cap removed and a tubular nozzle inserted into the fill pipe to add fuel to the tank. The fit of the nozzle into the fill pipe is generally very loose and most fuels, in particular gasoline, are relatively non-viscous. As a result splash back of fuel up the fill pipe and out the opening is not an infrequent event. Such splash back dirties clothing, is disagreeably odorous and contains known carcinogens. There is also a potential fire hazard.

As a result a number of devices have been developed to control splash back. U.S. Pat. No. 1,903,139 discloses a metal baffle attached to the outside of the nozzle. More recently U.S. Pat. No. 3,451,445 discloses a frusto-conical spongy baffle to catch and retain liquid fuel but permit air to pass therethrough and U.S. Pat. No. 3,739,988 discloses a plastic baffle attached to the outside of the nozzle.

U.S. Pat. No. 3,903,942 discloses a flexible duckbill valve that grasps the nozzle upon insertion in the fill pipe. Although directed to prevention of vapor emissions from the fill pipe, the valve also is directed to prevention of liquid splash. U.S. Pat. No. 4,326,641 discloses an anti-siphon tube depending from a baffle within the upper end of the fill pipe. The baffle also acts as a splash back preventer although some splash back can occur about a loose fitting nozzle.

Most motor vehicles are not equipped with anti-splash back devices as disclosed in the prior art and filling stations do not all make a practice of fitting nozzles with suitable baffles. Thus, a need exists for an after market splash guard that can be easily installed by the novice owner or operator of a motor vehicle.

SUMMARY OF THE INVENTION

The splash guard comprises a substantially disc shaped plastic or rubber flexible baffle having a hinged attachment to one side. Through the hinged attachment, the baffle is attached to a motor vehicle to place the baffle over the fill pipe cap of the fuel tank fill pipe. The flexible baffle and hinged attachment permit the baffle to be manually moved aside to permit the fill pipe cap to be removed or replaced.

The splash guard baffle includes a central hole sized to sealingly engage a gas pump nozzle or similar nozzle when is inserted into the open fill pipe. Detachable magnetic means retain the baffle in position over the fill pipe entrance and within the access opening to the fill pipe.

In one embodiment the baffle is hingedly attached to the inside of the access door to the fill pipe chamber. The attachment includes a tail on the baffle adhesively attached to the access door. In another embodiment the baffle is attached to a frame in turn attached to the fill pipe just below the cap. The flexibility of the baffle is relied upon to act as a hinge.

Being positioned above the fill pipe cap and inside the access door provides a splash guard on the motor vehicle that is hidden from view by the access door and does not interfere with the cap or require any modifications to the fill pipe and cap. Thus, the splash guard is suitable as an aftermarket customer installed unit adaptable to use on most modern motor vehicles.

BRIEF DESCRIPTION OF THE DRAWINGS

FIG. 1 is a plan view of the splash guard;

FIG. 2 is a partial cutaway top view of the splash guard of FIG. 1 installed to a filler cap cover door;

DESCRIPTION OF THE PREFERRED EMBODIMENTS

Figure 3:
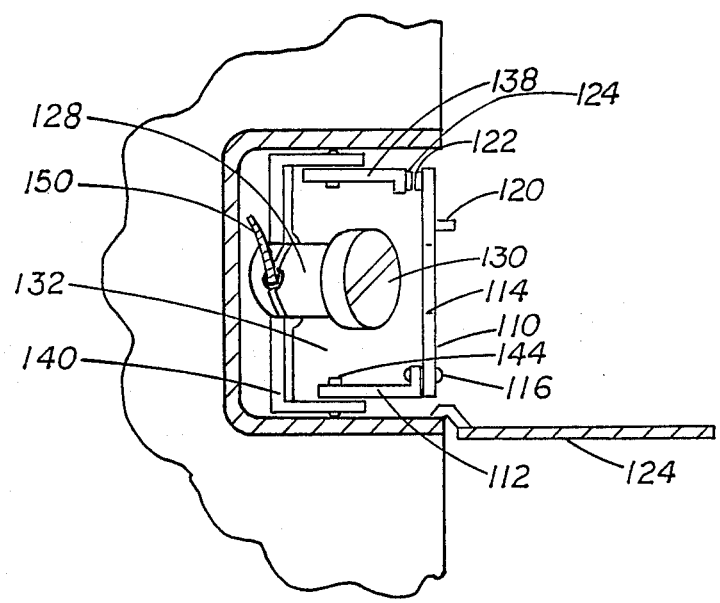
FIG. 3 is a partial cutaway top view of an alternate form of splash guard installed over a filler cap.

Illustrated in FIG. 1 is a splash guard comprising a round portion 10 and integral tail 12. The round portion 10 includes a central hole 14 sized to permit a gas pump nozzle to fit therethrough. As shown, the guard is flat and constructed of flexible plastic. The thickness of the guard is reduced at 16 and 18 to form hinge lines. The balance of the guard is sufficiently rigid to retain a substantially flat shape in the relaxed state. A tab 20 extends from the guard 10 and provides a means to grasp to the guard. On the other side of the guard 10 is a small permanent magnet 22.

In FIG. 2 the guard 10 is attached by the tail 12 to a filler door cover 24 with a contact adhesive at 26. The guard 10 is positioned with the hole 14 aligned over the fill pipe 28 and cover 30. Within the chamber 32 behind the fill pipe door 24 is a magnetic contact 34 adhesively attached at 36 with a bracket 38 to the the inside wall of the chamber.

The tab 20 and guard 10 are sufficiently flexible to fold down inside the chamber 32 when the door 24 is closed. When the door 24 is opened, the tab 20 can be grasped to pull the guard 10 out of the way. The cover 30 is removed and the tab 20 released permitting the guard 10 to latch to the bracket 38. The gas pump nozzle can then be placed through the hole 14 and into the fill pipe 28.

Figure 4:
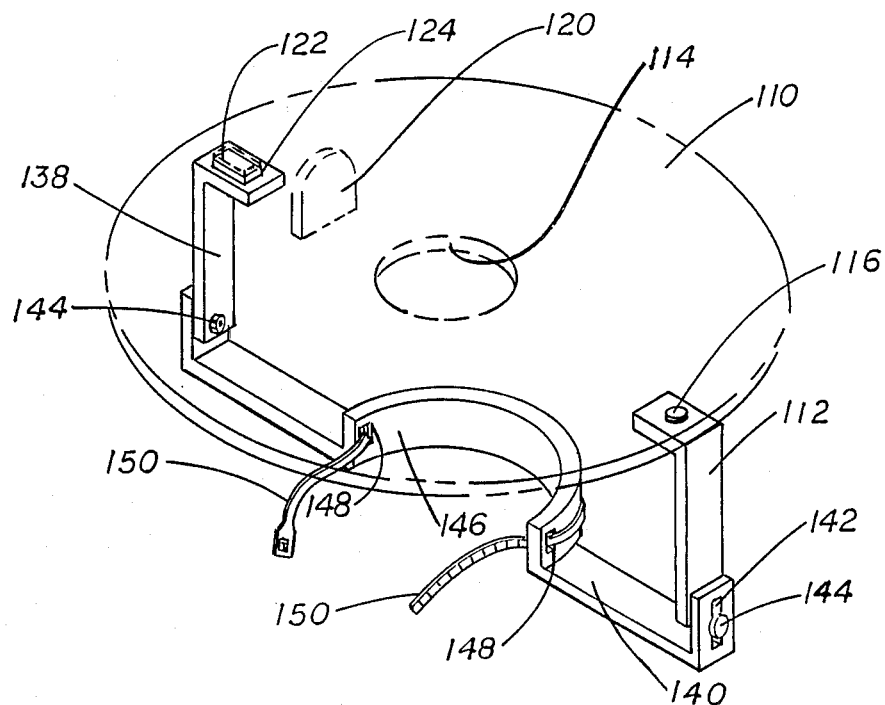
FIG. 4 is a perspective view of the alternate form of splash guard in FIG. 3.

In FIGS. 3 and 4 an alternate form of the splash guard 110 is illustrated. The guard 110 comprises a flexible plastic disc having a central hole 114 and a grasping tab 120. Riveted at 116 to the disc is a steel "L" shaped bracket 112. Diametrically opposite the bracket 112 is a magnet 122 engageable with a second magnet 124 and steel "L" shaped bracket 138. Brackets 112 and 138 are attached to the ends of a double "U" shaped arm 140. Each end of the arm 140 includes a slot 142 and bolt 144 that adjustably attach the brackets 112 and 138 to the arm 140. The arm 140 includes a central portion 146 curved to fit about a fill pipe 128 below the cover 130. The central portion 146 includes a pair of slots 148 through which is threaded a cable tie 150. The cable tie 150 fastens the arm 146 tightly to the fill pipe 128 in turn fastening the splash guard 110 within the chamber 132.

In the same manner as above the tab 120 is grasped to pull the guard 110 outward to uncover the cover 130. The pump nozzle can then be inserted through the hole 114 and into the fill pipe 128 after the tab 120 is released and the magnet 122 engages the magnet 124 and bracket 138. The slot 142 and bolt 144 attachments permit the guard 110 to be adjustably fastened within the chamber 132. The arm 140 can thereby be swivelled to accommodate the angular position of most fill pipes relative to the chamber 132 and cover door 124. The flexibility of the disc 110 is relied upon to provide the hinge about the rivet 116 and bracket 112.

Figure 6:
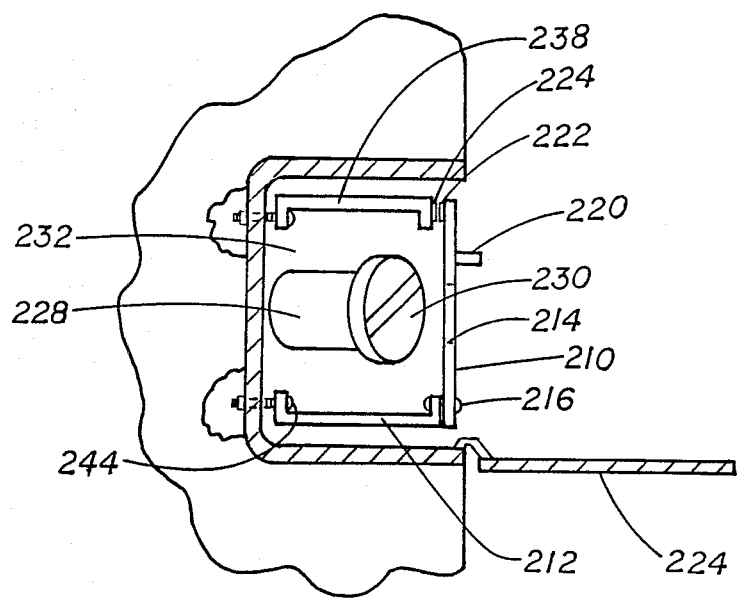
FIG. 6 is a partial cutaway top view of the splash guard of FIG. 5 installed over a filler cap.
Figure 5:
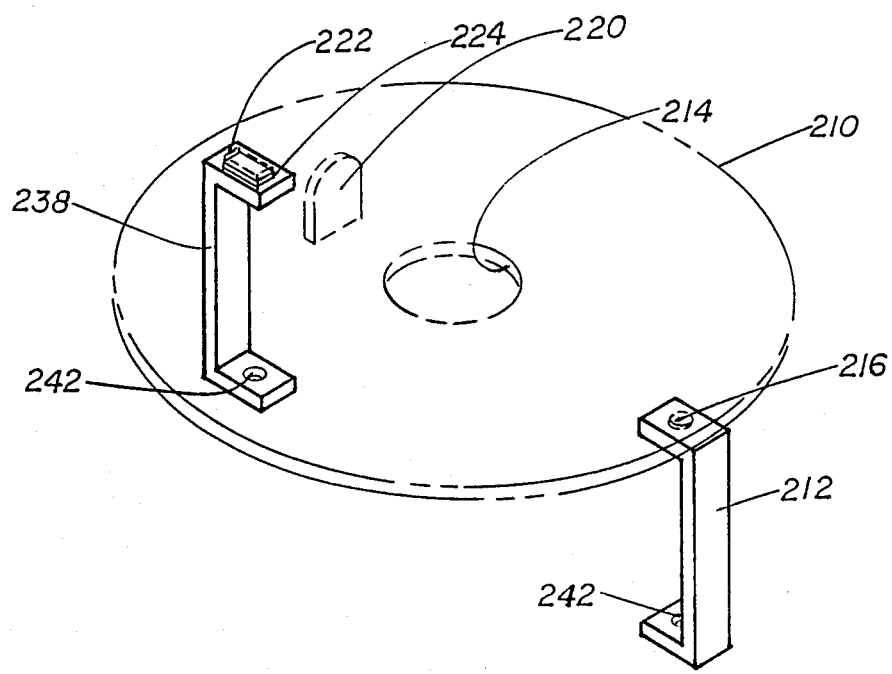
FIG. 5 is a perspective view of a second alternate form of splash guard.

Illustrated in FIGS. 5 and 6 is a second alternate embodiment of the splash guard 210 also having a central hole 214 in the flexible plastic disc. The guard 210 includes a "U" shaped bracket 212 riveted at 216 to the disc and a magnet 222 located diametrically opposite. The magnet 222 is engageable with a second magnet 224 attached to a second "U" shaped bracket 238. At the lower end of each "U" shaped bracket 212 and 238 is a hole 242 for attachment within the chamber 232. This embodiment is directed to chamber 232 having a pair of screws or bolts 244 on either side of the fill pipe 228 to which the brackets 212 and 238 can be attached through the holes 242.

Hereagain after opening the cover door 224 the tab 220 can be grasped and pulled to pull aside the guard 210 from above the fill pipe cover 230 and the fill pipe cover removed. The pump nozzle can then be inserted through the hole 214 and into the fill pipe 228. The magnet 222 engages the magnet 224 to retain the guard 210 down in place when the tab 220 is not grasped and pulled. The flexibility of the disc 210 is relied upon to provide the hinge about the riveted 216 and bracket 212.

In the embodiments disclosed above a magnet catch has been disclosed to retain the disc or baffle in place. Other detachable means may also be substituted such as a hook and loop fastener. The detachable catch may be optionally deleted by the use of a plastic or rubber material with suitable resiliency or a "memory" causing the disc or baffle to always remain properly proportioned over the fill pipe opening when not pulled aside.

I claim:

1. An automotive fill pipe splash guard at a fill pipe entrance of a vehicle comprising a flexible disc surrounding an opening therethrough, the opening being smaller than a fill pipe entrance and the opening thereby forming an inner periphery of the disc, means said on said disc adjacent the outer periphery of the disc and substantially spaced from the inner periphery and the fill pipe entrance, at substantially one location adapted for attachment of the disc to the vehicle adjacent the fill pipe entrance, means on the disc spaced from said attachment means to manually grasp the disc and means on the disc spaced from the attachment means adapted for releasable engagement of the vehicle wherein the disc opening therethrough is positioned generally over the fill pipe entrance.

2. The splash guard of claim 1 wherein said attachment means comprises a tail extending from the outer periphery of the disc, said tail being movable relative to the disc and means on the tail adapted for fastening the tail to a vehicle.

3. The splash guard of claim 2 wherein said tail fastening means comprises adhesive adapted to be fastenable to the inside of a fill pipe door.

4. The splash guard of claim 2 wherein said tail is adapted to be fastened to the inside of a fill pipe door.

5. The splash guard of claim 2 including a molded integral hinge joining the disc to the tail.

6. The splash guard of claim 1 wherein the releasable engagement means comprises a magnet.

7. The splash guard of claim 1 wherein the attachment means comprises a bracket attached at a location adjacent the outer periphery of the disc, said bracket including means adapted to attach to an automotive fill pipe to thereby support the disc above the fill pipe entrance.

8. The splash guard of claim 7 including a second bracket extending from the means adapted to attach to a fill pipe to a second location spaced from the first bracket attachment location to the disc to thereby support the releasable engagement means to the disc.

9. The splash guard of claim 1 wherein the attachment means comprises a first bracket attached at a location adjacent the periphery of the disc, said bracket including means adapted to attach directly to the vehicle body and a second bracket including means adapted to attach directly to the vehicle body and extending to a second location spaced from the first bracket attachment location to the disc to thereby support the releasable engagement means to the disc.

10. An automotive fill pipe splash guard at a fill pipe entrance of a vehicle comprising a flexible disc surrounding an opening therethrough, the opening being smaller than a fill pipe entrance and the opening thereby forming an inner periphery of the disc, means on said disc adjacent the outer periphery of the disc and substantially spaced from the inner periphery and the fill pipe entrance at at least one location adapted to attach the disc to a vehicle whereby the disc opening is positioned over the fill pipe entrance.

11. The splash guard of claim 10 wherein said attachment means comprises an integral tail extending from the outer periphery of the disc, said tail being movable relative to the disc and means on the tail adapted for fastening the tail to a vehicle.

12. The splash guard of claim 11 wherein the tail includes means adapted to fasten to a fill pipe access door.

13. The splash guard of claim 11 including an integral molded hinge joining the tail to the disc.

14. The splash guard of claim 10 wherein said attachment means comprises a bracket attached at at least one location adjacent the outer periphery of the disc, said bracket including means adapted to attach to an automotive fill pipe to thereby support the disc over the fill pipe entrance.

15. The splash guard of claim 10 wherein said attachment means comprises a bracket attached at at least one location adjacent the outer periphery of the disc, said bracket including means adapted to attach directly to the vehicle body to thereby support the disc over the fill pipe entrance.

16. In an automotive vehicle having a fill pipe and a fill pipe entrance and a extending into a chamber, a removable cap on the fill pipe within the chamber and as access door covering the chamber, the improvement comprising a flexible baffle surrounding an opening therethrough, the opening being smaller than a fill pipe entrance and the opening forming an inner periphery of the baffle, means on said baffle adjacent the outer periphery of the baffle and substantially spaced from the inner periphery and the fill pipe entrance at at least one location for attachment of the baffle to the vehicle whereby the baffle opening is positioned over the fill pipe entrance upon opening of the access door.

17. The vehicle of claim 6 wherein the attachment means comprises a tail extending from the outer periphery of the baffle and means on the tail to fasten to an access door.

18. The vehicle of claim 16 wherein the attachment means comprises a tail extending from the outer periphery of the baffle and integral therewith, said tail movable relative to the baffle.

19. The vehicle of claim 16 wherein the attachment means comprises a bracket attached at at least one location adjacent the outer periphery of the baffle, said bracket includinmg means to attach to the vehicle fill pipe to thereby support the baffle over the fill pipe entrance.

20. The vehicle of claim 16 wherein the attachment means comprises a bracket attached at at least one location adjacent the outer periphery of the baffle, said bracket including means to attach directly to the vehicle body to thereby support the baffle over the fill pipe entrance.

* * * * *